(12) United States Patent
Wosik

(10) Patent No.: US 6,598,908 B1
(45) Date of Patent: Jul. 29, 2003

(54) HYDRAULIC FITTING

(76) Inventor: Marshall W. Wosik, 3828 Top View Ct., Bloomfield Hills, MI (US) 48304

( * ) Notice: Subject to any disclaimer, the term of this patent is extended or adjusted under 35 U.S.C. 154(b) by 0 days.

(21) Appl. No.: 09/595,792

(22) Filed: Jun. 16, 2000

(51) Int. Cl.$^7$ .................................................. F16L 25/00
(52) U.S. Cl. .................................. 285/334.5; 285/332.3
(58) Field of Search .......................... 285/332.2, 332.3, 285/334.5, 354, 355, 918, 910; 277/910

(56) References Cited

U.S. PATENT DOCUMENTS

| | | | |
|---|---|---|---|
| 115,917 A | 6/1871 | Wharton | |
| 322,286 A | 7/1885 | Hemje | |
| 494,801 A | 4/1893 | Weber | |
| 820,437 A | 5/1906 | Pehrson | |
| 904,673 A | * 11/1908 | Bideker | 285/354 X |
| 959,960 A | 5/1910 | Oleson | |
| 1,191,503 A | 7/1916 | Ford | |
| 1,301,245 A | 4/1919 | Fox | |
| 1,563,836 A | 11/1925 | Copp | |
| 1,800,753 A | 4/1931 | Replogle | |
| 1,936,552 A | 11/1933 | Goss | |
| 2,025,382 A | 12/1935 | Fletcher et al. | |
| 2,284,216 A | 5/1942 | Kunkel | |
| 2,320,397 A | * 6/1943 | Ross | 285/332.3 X |
| 2,381,829 A | 8/1945 | Livers | |
| 2,453,813 A | 11/1948 | Prince | |
| 2,458,817 A | 1/1949 | Wolfram | |
| 2,560,263 A | 7/1951 | Wiegand et al. | |
| 2,730,380 A | 1/1956 | Espy et al. | |
| 2,775,471 A | 12/1956 | Douglass | |
| 2,926,027 A | 2/1960 | Marquis | |
| 2,946,606 A | 7/1960 | Smith | |
| 3,058,761 A | 10/1962 | Christophersen | |
| 3,124,502 A | * 3/1964 | Radke | 285/910 X |
| 3,163,450 A | * 12/1964 | Eirhart, Jr. | 285/334.5 X |
| 3,258,279 A | 6/1966 | Johnsen | |
| 3,273,917 A | 9/1966 | Chakroff | |
| 3,395,925 A | 8/1968 | Dreiding | |
| 3,468,566 A | 9/1969 | Nietzel | |
| 3,537,731 A | 11/1970 | Reddy | |
| 3,615,109 A | 10/1971 | Brinda et al. | |

(List continued on next page.)

FOREIGN PATENT DOCUMENTS

| | | | | |
|---|---|---|---|---|
| CA | 627965 | * | 9/1961 | 285/332.3 |
| DE | 42 07 958 | * | 8/1993 | 285/332.3 |
| FR | 1086073 | | 2/1955 | |
| GB | 9171 | * | 7/1885 | 285/332.3 |
| GB | 204900 | | 11/1923 | |

*Primary Examiner*—Greg Binda
(74) *Attorney, Agent, or Firm*—Warn, Burgess & Hoffmann, P.C.

(57) ABSTRACT

A connector for a fluid conduit is provided herein. The connector includes a conduit structure and an annular seal member. The conduit structure has a frustro-conical surface and a seal groove. The frustro-conical surface may be an external surface or an internal surface, depending upon the desired configuration of the connector. The seal groove is formed into the frustro-conical surface along an axis perpendicular to the frustro-conical surface. The seal groove is preferably defined by a constant radius. The annular seal member is coupled to the conduit structure and disposed at least partially in the seal groove.

19 Claims, 6 Drawing Sheets

U.S. PATENT DOCUMENTS

| | | |
|---|---|---|
| 3,695,642 A | 10/1972 | Dewoody |
| 3,847,421 A | 11/1974 | Eschbaugh et al. |
| 3,940,843 A | 3/1976 | Yeager |
| 3,984,133 A | 10/1976 | Bird |
| 3,997,193 A | 12/1976 | Tsuda et al. |
| 4,135,742 A | 1/1979 | Anderson |
| 4,458,926 A | 7/1984 | Williamson |
| 4,648,627 A * | 3/1987 | Reimert .................. 285/334 X |
| 4,934,742 A | 6/1990 | Williamson |
| 5,060,988 A | 10/1991 | Williamson |
| 5,076,616 A | 12/1991 | Williamson |
| 5,115,550 A | 5/1992 | Williamson |
| 5,197,769 A | 3/1993 | Williamson |
| 5,358,168 A | 10/1994 | Williamson |
| 5,439,257 A | 8/1995 | Williamson |
| 5,516,156 A | 5/1996 | Williamson |
| 5,516,157 A | 5/1996 | Williamson |
| 5,533,764 A | 7/1996 | Williamson |
| 5,533,765 A | 7/1996 | Williamson et al. |
| 5,895,079 A * | 4/1999 | Carstensen et al. .. 285/334.2 X |

* cited by examiner

HYDRAULIC FITTING

BACKGROUND AND SUMMARY OF THE INVENTION

1. Technical Field

The present invention relates generally to fluid coupling adapters and more particularly to fluid coupling adapters for use in systems having a high fluid pressure.

2. Discussion

A common conduit fitting utilizes a male adapter having a conical nose which engages a flared or conical surface defined upon a conduit wherein the conical surfaces of the conduit fitting and conduit engage in metal-to-metal relationship. A nut is typically employed to produce an axial force to engage the conical surfaces against one another. Unless the conical surfaces are substantially concentric, accurately formed and free of defects such as scratches or nicks, leakage may result even though the nut is fully tightened. Furthermore, "cold flow" and/or "creep" may result in dimensional changes of the conduit fitting or conduit, permitting leakage. Also, leakage sometimes occurs when the machinery is shut off. This is due to the hydraulic components contracting which causes dimensional changes.

Historically, problems have been encountered in fluid systems using such conical conduit fittings. For example, leakage has occurred, particularly where conduit fittings and conduits are located on machinery in hard to see places or where hazardous or combustible fluids are being used, or where the leakage is sufficient to impair the fluid conducting capacity of the conduit.

It is therefore one object of the present invention to provide a connector for a fluid conduit having improved sealing capabilities and performance during vibration.

It is another object of the present invention to provide a connector for a fluid assembly that is easier to assemble.

It is another object of the present invention to provide a connector for a fluid conduit which employs an annular seal to sealingly engage a mating connector.

It is a further object of the present invention to provide a connector for a fluid conduit wherein a groove is formed into a member of the connector which retains an annular seal.

It is yet another object of the present invention to provide a connector for a fluid conduit wherein a seal groove is formed into a member of the connector in a direction normal to a mating seal surface.

It is another object of the present invention to provide a connector for a fluid conduit wherein a seal groove of a constant radius is formed into a member of the connector.

This invention concerns a connector for a fluid conduit. The connector includes a conduit structure and an annular seal member. The conduit structure has a frustro-conical surface and a seal groove. The frustro-conical surface may be an external surface or an internal surface, depending upon the desired configuration of the connector. The seal groove is formed into the frustro-conical surface along an axis perpendicular to the frustro-conical surface. The seal groove is preferably defined by a constant radius. The annular seal member is coupled to the conduit structure and disposed at least partially in the seal groove.

Additional advantages and features of the present invention will become apparent from the subsequent description and the appended claims, taken in conjunction with the accompanying drawings.

DETAILED DESCRIPTION OF THE PREFERRED EMBODIMENT

Figure 1:
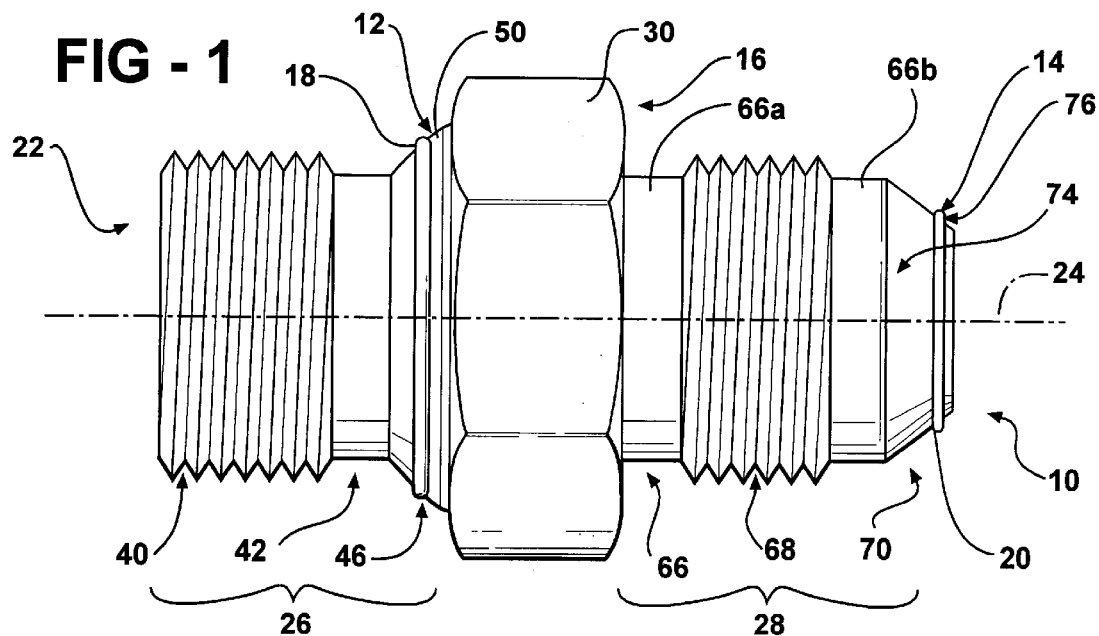
FIG. 1A is a side view of a fitting constructed in accordance with the teachings of a preferred embodiment of the present invention.
Figure 2:
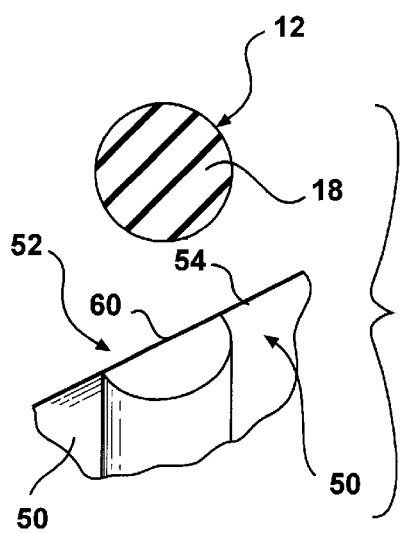
FIG. 2 is an enlarged view of a portion of the fitting of FIG. 1 illustrating the annular seal set off from the body of the fitting.
Figure 3:
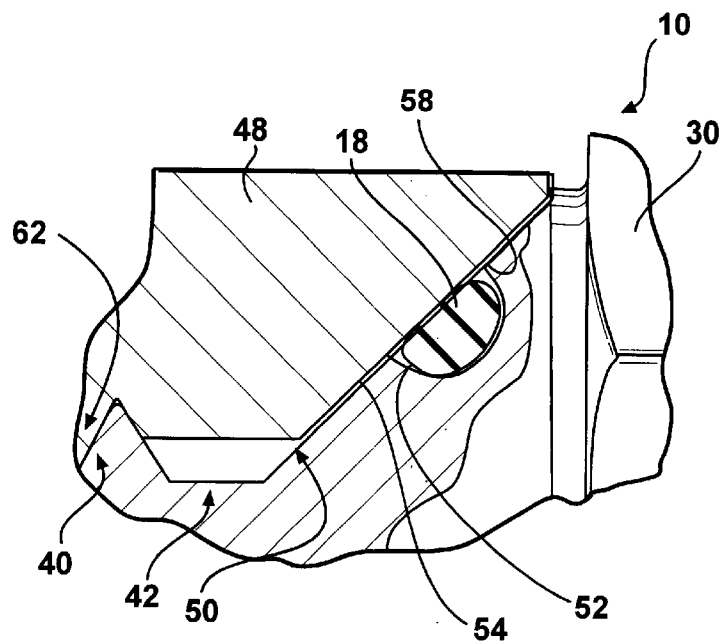
FIG. 3 is a partial cross-sectional view of a portion of the fitting of FIG. 1 illustrating a first portion of the fitting in operative association with a connector.

With reference to FIGS. 1 through 3 of the drawings, a connector constructed in accordance with the teachings of a preferred embodiment of the present invention is generally indicated by reference numeral 10. Connector 10 includes first and second annular seals 12 and 14, respectively, and a unitarily formed body 16. First and second annular seals 12 and 14 are illustrated to be conventional o-rings 18 and 20, respectively, formed from an elastomeric material. O-rings 18 and 20 have circular cross-sections when in an unstressed state but are readily deformable and compressible.

Body 16 includes a central aperture 22 which extends along the longitudinal axis 24 of body 16. In the embodiment illustrated in FIG. 1, body 16 also includes first and second conduit structures 26 and 28, respectively, and a conventional hex-shaped wrenching portion 30 which permits connector 10 to be installed with a conventional tooling, such as socket wrenches or open or box-ended wrenches. Body 16 is preferably formed from steel, brass, bronze, plastic or aluminum. Alternative materials could be used.

First conduit structure 26 is shown to have a first threaded portion 40, a first unthreaded portion 42 and a first seal portion 46. First threaded portion 40 is externally threaded with a thread form that is preferably straight (i.e., non-tapered) which is not designed to sealingly engage a corresponding female thread. Consequently, torque applied to connector 10 during its installation is converted into a clamp load which is exerted onto first annular seal 12. Alternatively, first threaded portion 40 may include a thread form which is tapered and designed to sealingly engage a corresponding female thread. However, in such situations, torque applied to connector 10 during its installation is apportioned in a manner which is not precisely known between the tapered threads and clampload which is transmitted to first annular seal 12.

First unthreaded portion 42 is in juxtaposed relationship with first threaded portion 40. In the embodiment illustrated, first unthreaded portion 42 is smaller in diameter than the minor diameter of the first threaded portion 40 so as to prevent first unthreaded portion 42 from interfering with a mating first female connector 48. Alternatively, first unthreaded portion 42 may be eliminated, permitting first threaded portion 40 to abut first seal portion 46.

First seal portion 46 is in juxtaposed relationship with first unthreaded portion 42 and wrenching portion 30 being located adjacent the first seal portion 46. First seal portion 46 includes a tapered portion 50 and a grooved portion 52. Tapered portion 50 includes a generally frustro-conical exterior surface 54 and is designed to sealingly engage a frustro-conical interior surface 58 of first female connector 48. The included angle of frustro-conical exterior surface 54 is about 15 degrees to about 130 degrees.

Grooved portion 52 is semi-circular in cross-section and sized to receive o-ring 18 having a diameter (d). Grooved portion 52 is formed into tapered portion 50 perpendicular to frustro-conical exterior surface 54. Grooved portion 52 is defined by a constant radius which is preferably equal to approximately 75% of the diameter of the circular cross-section of first annular seal 12. The center point of the radius that defines grooved portion 52 lies approximately along a line 60 coincident with frustro-conical exterior surface 54. The depth of grooved portion 52 is approximately equal to seventy-five percent of the diameter (r=0.75 d) of the first annular seal 12 when uncompressed. In one particular example, the diameter of the circular cross-section of o-ring 18 is 0.0394 inches (1 mm) and the radius which defines grooved portion 52 is 0.02955 inches.

First female connector 48 is shown to conventionally include frustro-conical interior surface 58 and an internally threaded portion 62. Threaded engagement of first threaded portion 40 to internally threaded portion 62 generates a clamping force which is transmitted to first seal portion 46, thereby bringing o-ring 18 into sealed relationship with grooved portion 52 and frustro-conical interior surface 58. Continued engagement of first threaded portion 40 into internally threaded portion 62 brings frustro-conical exterior surface 50 into sealing contact with frustro-conical interior surface 58.

Second conduit structure 28 is shown to have a second unthreaded portion 66, a second threaded portion 68 and a second seal portion 70. Second threaded portion 68 is positioned between the ends of the second unthreaded portion 66. Second threaded portion 68 is externally threaded with a thread form that is preferably straight (i.e., non-tapered) which is not designed to sealingly engage a corresponding female thread. Consequently, torque applied to a mating second female connector 72 is converted into a clamp load which is exerted onto second seal portion 70.

A first end 66a of second unthreaded portion 66 abuts wrenching portion 30 and a second end 66b of second unthreaded portion 66 abuts second seal portion 70. Alternatively, the first end 66a of second unthreaded portion 66 may be omitted permitting second threaded portion 68 to abut wrenching portion 30. In the embodiment illustrated, second unthreaded portion 66 is smaller in diameter than the minor diameter of the second threaded portion 68 so as to prevent second unthreaded portion 66 from interfering with second female connector 72.

Second seal portion 70 includes a tapered portion 74 and a grooved portion 76. With specific reference to FIG. 4, tapered portion 74 includes a frustro-conical exterior surface 78 which is designed to sealingly engage second female connector 72. The included angle of frustro-conical exterior surface 78 is about 40 degrees to about 130 degrees.

Grooved portion 76 is semi-circular in cross-section and sized to receive o-ring 20. Grooved portion 76 is formed into tapered portion 74 normal to frustro-conical exterior surface 78. Grooved portion 76 is defined by a constant radius which is preferably equal to approximately one-half of the diameter of the circular cross-section of second annular seal 14. The center point of the radius that defines grooved portion 76 lies approximately along a line 77 coincident with frustro-conical exterior surface 78. The depth of grooved portion 76 is approximately equal to seventy-five percent of the diameter of the second annular seal 14 when uncompressed. In one example, the diameter of the circular cross-section of o-ring 20 is 0.0394 inches (1 mm) and the radius which defines grooved portion 76 is 0.020 inches (0.51 mm).

Figure 4:
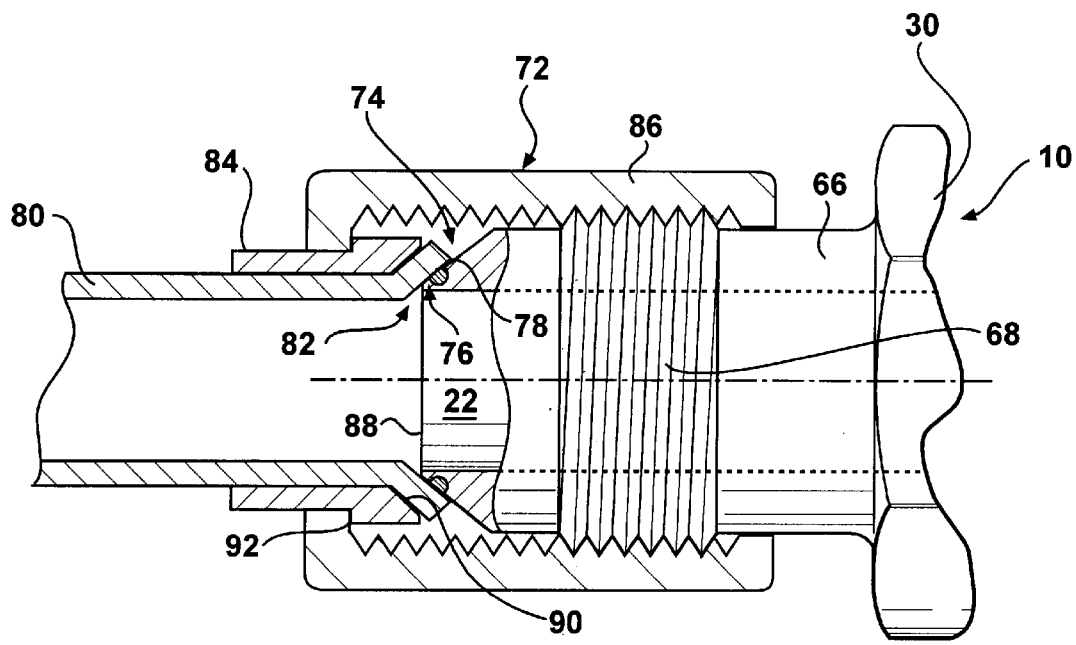
FIG. 4 is a partial cross-sectional view of a portion of the fitting of FIG. 1 illustrating a second portion of the fitting in operative association with a second connector.

With reference to FIG. 4, second female connector 72 is shown to conventionally include a tube 80 having a flared end portion 82, a sleeve 84 and a threaded collar 86. Flared end portion 82 includes a frustro-conical interior surface 88. Sleeve 84 is coaxial to tube 80 and includes a conical seat 90 which abuts the exterior surface of the flared end portion 82 of tube 80. Sleeve 84 also includes an annular seat 92 which abuts threaded collar 86. Threaded engagement of threaded collar 86 to second threaded portion 68 generates a clamping force which is transmitted through sleeve 84 and tube 80 to second seal portion 70, thereby bringing o-ring 20 into sealed relationship with grooved portion 76 and the frustro-conical interior surface 88 of tube 80. Continued engagement of threaded collar 86 to second threaded portion 68 frustro-conical exterior surface 78 into sealing contact with frustro-conical interior surface 88.

Figure 5:
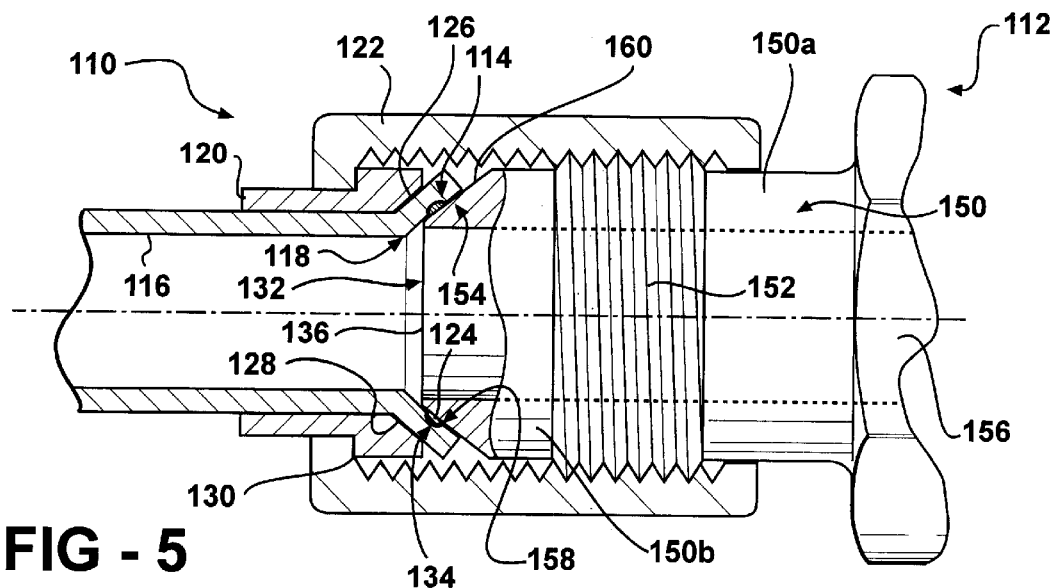
FIG. 5 is a partial cross-sectional view of a connector constructed in accordance with the teachings of a second preferred embodiment of the present invention illustrated in operative association with a fitting.

In FIG. 5, a connector constructed in accordance with the teachings of a second preferred embodiment of the present invention is generally indicated by reference numeral 110. Connector 110 is illustrated in operative association with a mating male connector 112. In this version the o-ring groove is within the tube.

Connector 110 is illustrated to include an annular seal 114, a tube 116 having a flared end portion 118, a sleeve 120 and a threaded collar 122. Annular seal 114 is illustrated to be a conventional o-ring 124 formed from an elastomeric material. O-ring 124 has a circular cross-section when in an unstressed state but is readily compressible. Sleeve 120 is coaxial to tube 116 and includes a conical seat 126 which abuts the exterior surface 128 of the flared end portion 118 of tube 116. Sleeve 120 also includes an annular seat 130 which abuts threaded collar 122.

Flared end portion 118 includes a tapered portion 132 and a grooved portion 134. Tapered portion 132 includes a frustro-conical interior surface 136 which is designed to sealingly engage mating male connector 112. The included angle of frustro-conical interior surface 136 is about 40 degrees to about 130 degrees.

In the particular embodiment illustrated, grooved portion 134 is semi-circular in cross-section and sized to receive o-ring 20. However, with regard to this embodiment of the present invention, it will be understood that the configuration of grooved portion 134 may be altered to accommodate other various types of annular seals, and as such, the scope of the present invention will not be limited to those connectors having a grooved portion with a semi-circular cross-section.

Grooved portion 134 is formed into tapered portion 132 normal to frustro-conical interior surface 136. As illustrated, grooved portion 134 is defined by a constant radius which is preferably equal to approximately one-half of the diameter of the circular cross-section of annular seal 114. The center point of the radius that defines grooved portion 134 lies approximately along a line (not specifically shown) which coincides with the outermost portion of frustro-conical interior surface 136. The depth of grooved portion 134 is approximately equal to seventy-five percent of the diameter of the annular seal 114 when uncompressed. In one example, the diameter of the circular cross-section of o-ring 124 is 0.0394 inches (1 mm) and the radius which defines grooved portion 134 is 0.020 inches (0.51 mm).

Male connector 112 is shown to have an unthreaded portion 150, a threaded portion 152 and a seal portion 154. Threaded portion 152 is positioned between the ends of unthreaded portion 150. Threaded portion 152 is externally threaded with a thread form that is preferably straight (i.e., non-tapered) which is not designed to sealingly engage the internal threads of threaded collar 122. Consequently, torque applied to threaded collar 122 is converted into a clamp load which is exerted onto seal portion 154.

A first end 150a of unthreaded portion 150 abuts a body portion 156 of male connector 112 and a second end 150b of unthreaded portion 150 abuts seal portion 154. In the embodiment illustrated, unthreaded portion 150 is smaller in diameter than the minor diameter of threaded portion 152 so as to prevent unthreaded portion 150 from interfering with the internal threads of threaded collar 122.

Seal portion 154 includes a tapered portion 158 having a frustro-conical exterior surface 160 which is designed to sealingly engage connector 110. The included angle of frustro-conical exterior surface 160 is about equal to the included angle of frustro-conical interior surface 136.

Threaded engagement of threaded collar 122 to threaded portion 152 generates a clamping force which is transmitted through sleeve 120 and tube 116 to tapered portion 118, thereby bringing o-ring 124 into sealed relationship with grooved portion 134 and the frustro-conical exterior surface 160 of male connector 112. Continued engagement of threaded collar 122 to threaded portion 152 brings frustro-conical exterior surface 160 into sealing contact with frustro-conical interior surface 136.

Figure 6:
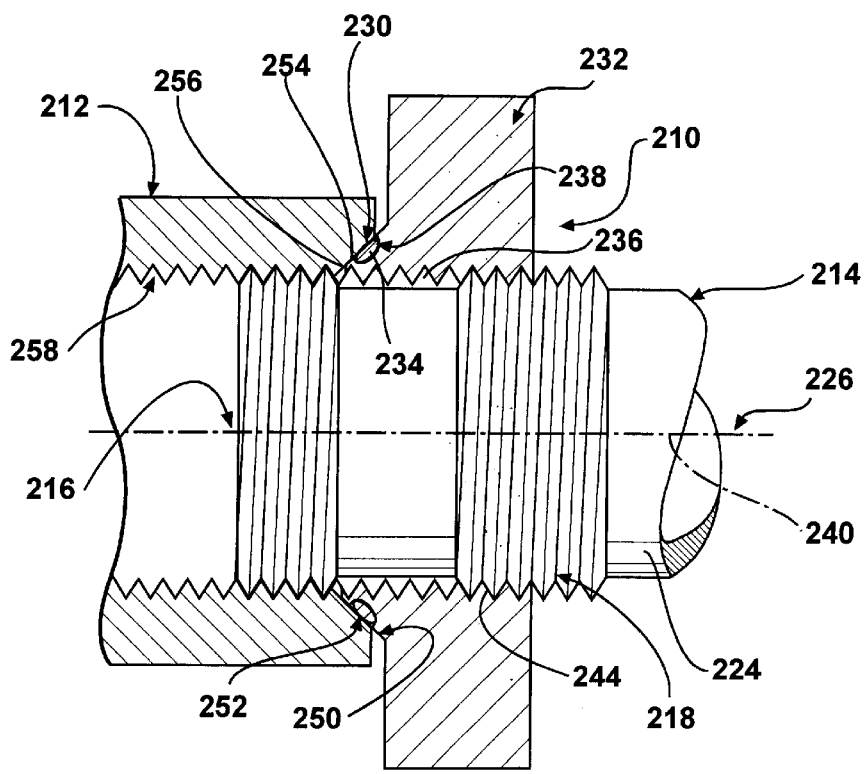
FIG. 6 is a cross-sectional view of a connector constructed in accordance with the teachings of a third preferred embodiment.

In FIG. 6, a connector constructed in accordance with the teachings of a third preferred embodiment of the present invention is generally indicated by reference numeral 210. Here a threaded nut or body 232 houses an O-ring. Connector 210 is illustrated in operative association with a mating female connector 212 and a threaded member 214. Threaded member 214 is generally cylindrical and includes first and second externally threaded portions 216 and 218. In the particular embodiment illustrated, threaded member 214 is a nipple 224 having a fluid conducting aperture 226 formed therethrough.

Connector 210 includes an annular seal 230 and a unitarily formed body 232. Annular seal 230 is illustrated to be a conventional o-ring 234 formed from an elastomeric material. O-ring 234 has a circular cross-sections when in an unstressed state but is readily compressible.

Body 232 is preferably formed from steel, brass, bronze, plastic or aluminum. It will be appreciated that other materials could be used. Body 232 includes a central aperture 236 and a seal portion 238. Central aperture 236 extends along the longitudinal axis 240 of body 232 and includes an internally threaded portion 244. Internally threaded portion 244 is threaded with a thread form that is preferably straight (i.e., non-tapered) which is not designed to sealingly engage the external threads of second externally threaded portion 218. Consequently, torque applied to connector 210 or threaded member 214 during their installation is converted into a clamp load which is exerted solely onto first annular seal 230. Alternatively, internally threaded portion 244 may include a thread form which is tapered and designed to sealingly engage a corresponding male thread. However, in such situations, torque applied to connector 210 or threaded member 214 during their installation is apportioned in a manner which is not precisely known between the tapered threads and clampload which is transmitted to annular seal 230.

Seal portion 238 includes a tapered portion 250 and a grooved portion 252. Tapered portion 250 includes a generally frustro-conical exterior surface 254 and is designed to sealingly engage a frustro-conical interior surface 256 of mating female connector 212. The included angle of frustro-conical exterior surface 254 is about 15 degrees to about 130 degrees.

Grooved portion 252 is semi-circular in cross-section and sized to receive o-ring 234. Grooved portion 252 is formed into tapered portion 250 at a right angle to frustro-conical exterior surface 254. Grooved portion 252 is defined by a constant radius which is preferably equal to approximately one-half of the diameter of the circular cross-section of first annular seal 230. The center point of the radius that defines grooved portion 252 lies approximately along a line coincident with frustro-conical exterior surface 254. The depth of grooved portion 252 is approximately equal to seventy-five percent of the diameter of the first annular seal 230 when uncompressed. In the particular embodiment illustrated, the diameter of the circular cross-section of o-ring 234 is 0.0394 inches (1 mm) and the radius which defines grooved portion 252 is 0.020 inches (0.51 mm).

Female connector 212 is shown to include a frustro-conical interior surface 256 and an internally threaded portion 258. The included angle of frustro-conical interior surface 256 is approximately equal to the included angle of frustro-conical exterior surface 254. Threaded engagement of first threaded portion 214 to internally threaded portion 258 generates a clamping force which is transmitted to seal portion 238, thereby bringing o-ring 234 into sealed relationship with grooved portion 252 and frustro-conical interior surface 256. Continued engagement of first threaded portion 214 into internally threaded portion 258 brings frustro-conical exterior surface 254 into sealing contact with frustro-conical interior surface 256.

Figure 7:
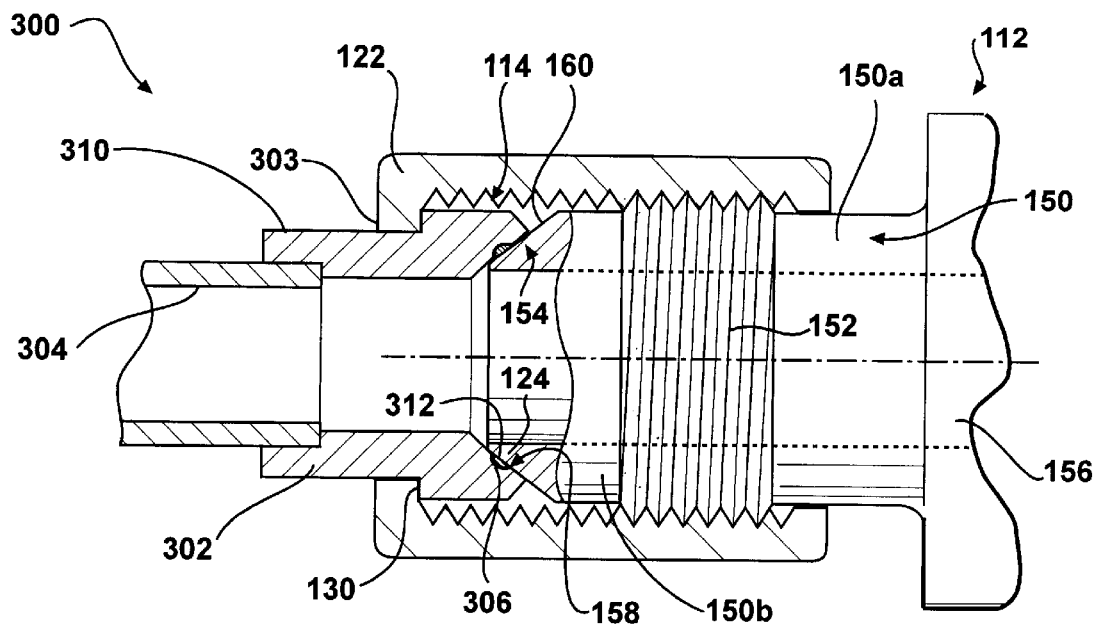
FIG. 7 is a partial cross-sectional view of a portion of an alternative fitting utilizing a modified sleeve.

FIG. 7 is an alternative hydraulic fitting construction to that disclosed in the FIG. 5 embodiment. Where applicable, like reference numbers will be utilized. Connector 300 is shown in operative association with a mating male connector 112. A difference between the fitting illustrated in FIG. 5 and the fitting illustrated in FIG. 7 is that the fitting assembly 300 utilizes a modified sleeve 302, a tube 304, a threaded collar 122, an o-ring 124, and the female connector 112.

The sleeve 302 is preferably elongated in shape and can be made of aluminum, steel, copper, nylon, or other materials depending on the application. The sleeve 302 has a grooved portion 306 operable to receive the o-ring 124. A seat 130 engages a flange 308 of the threaded collar 122. The opposite end of the sleeve 302 has a stepped portion 310 for receiving one end of a tube 304 carrying fluids. The tube is welded via conventional means to the sleeve 302.

Once the sleeve 302 and tube 304 are connected, an o-ring 124 can be located within the groove 306. The face 312 of the sleeve 302 seats against exterior surface 160 of the female connector 112 to form a sealed connection. The collar 122 rotates and operates to draw the sleeve 302 and female connector 112 together.

The grooved portion 306 is semi-circular in cross-section and sized to receive o-ring 124. The groove portion 306 is located normal to the face 312. The construction of the groove 306 is similar to the groove in the sleeve 120 of FIG. 4, and therefore no further detailed discussion will be presented here.

Figure 8:
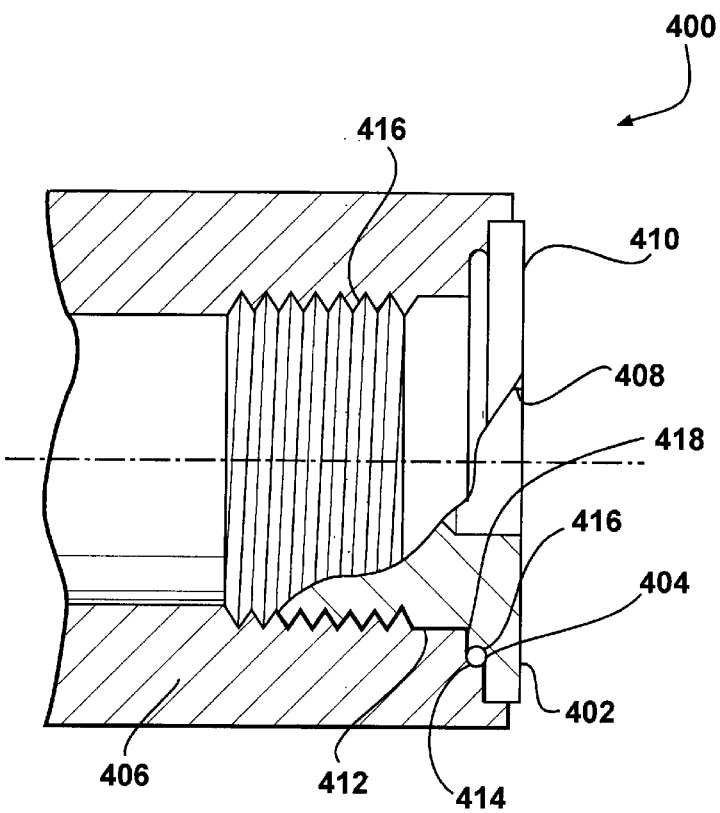
FIG. 8 is a partial cross-sectional view of a plug constructed in accordance with the teachings of the present invention.

FIG. 8 illustrates a hydraulic fitting assembly 400 that utilizes a plug 402, an o-ring 404, and a port or female connector 406. The plug 402 is comprised of an internal bore 408 that can be hexagonal in shape for receiving a tool for tightening and loosening the plug. The plug 402 further includes a cap 410, a frustro-conical portion 412, a groove portion 414, and a threaded portion 416. The groove portion 414 is designed similarly to the construction shown in FIGS. 2 and 3. However, the design is changed in that the o-ring 404 resides in a groove 414 located in the female member 406, as well as in a groove 416 that is located within the plug 402. This allows the seal to be compressed within to the cavity 418 that is created by grooves 414 and 416.

Figure 9:
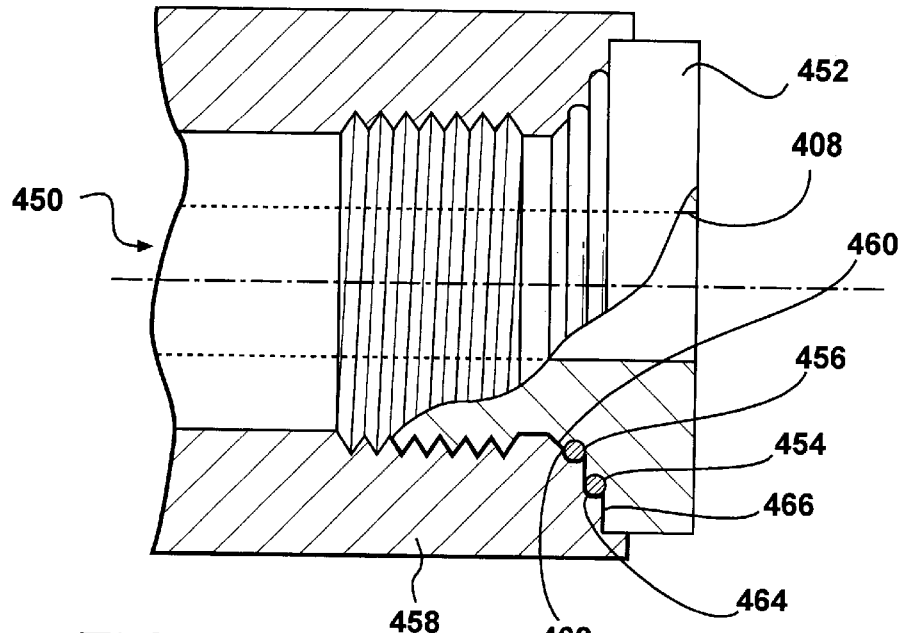
FIG. 9 is an alternative plug construction utilizing dual seals.

FIG. 9 illustrates an alternative fitting assembly 450 utilizing a plug 452, a first o-ring 454, a second o-ring 456 and a port 458. The fitting assembly 450 differs from the fitting 400 in that the fitting assembly 450 utilizes two brings and positions them differently with respect to the fitting assembly.

The plug 452 is comprised of a groove recess 460 that is operable to receive o-ring 456. The groove 460 is positioned on an inner surface 462 of the plug. The port 458 has a groove 464 that is normal to face 466. The grooves are slightly larger than the outer diameter of the o-rings yet allow for ample room for compression of the o-rings during assembly. The construction of the grooves 460 and 464 are similar to the construction of the groove 52 as disclosed in FIGS. 2 and 3 above.

Figure 10:
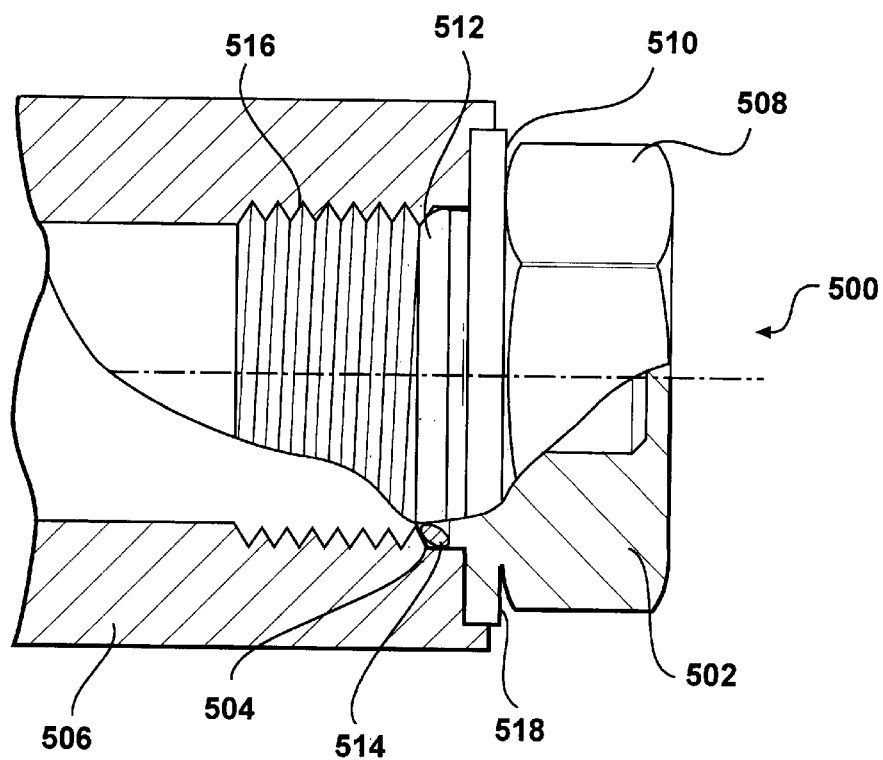
FIG. 10 is a cross-sectional view of an alternative plug fitting constructed in accordance with the teachings of the present invention.

FIG. 10 illustrates a partial sectional view of an alternative fitting assembly 500 utilizing a plug 502, an o-ring 504, and a port 506. The plug 502 is comprised of a hex-head portion 508 that is operable to receive a wrench, an integral washer face 510, a frustro-conical portion 512, a groove 514 within the face of the frustro-conical portion 512, and a threaded portion 516. The seal 504 is similar in construction to the o-ring 124 of FIG. 5. The groove 514 is located normal to the face of the frustro-conical surface 512 and is constructed similarly to the groove disclosed in FIG. 5.

The port 506 has a recess 518 for receiving the washer portion 510 of the plug. It will be appreciated that another o-ring could be located along the inner face of the washer 510 in the area of the recess 518.

Figure 11:
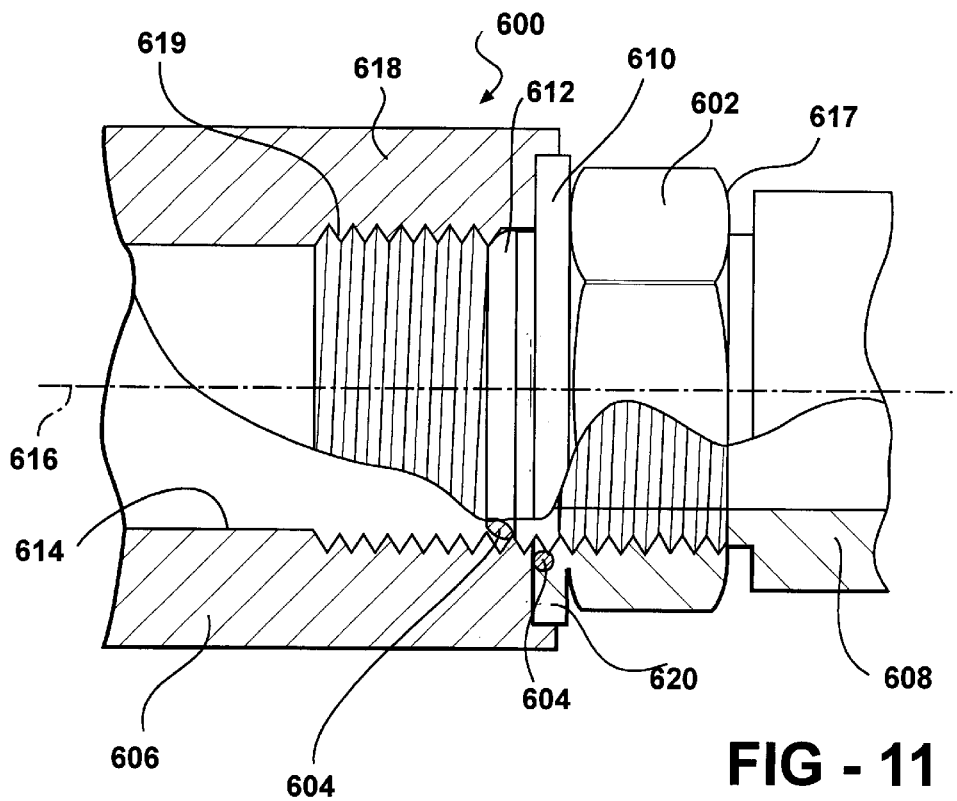
FIG. 11 is an alternative embodiment constructed in accordance with the teachings of the present invention.

FIG. 11 is an alternative illustration of yet an additional connector assembly 600 utilizing a nut 602, o-ring 604, a port 606 and a male connector 608. This embodiment differs from the FIG. 6 embodiment in that the nut design is different. The nut 602 includes an integral washer 610 (making it a flanged nut);and a frustro-conical face 612. An internal fluid passageway 614 extends through the assembly 600 and extends substantially parallel to axis 616. The nut 602 is comprised of a hex-head cap 617. Within the face is a groove 618 positioned normal to the face 612. The o-ring 604 is positioned in the groove 618 and extends into a recess adjacent the threaded area 619 of the port 606.

As an option, the washer 610 could have a face with a groove 620 for receiving a portion of another o-ring 604. The opposing surface within the port 606 could have a corresponding grooved portion 622 for receiving the o-ring 604. The grooves 618 and 620 are sized to operably receive o-ring 604. The resulting fluid assembly 600 creates a unique fluid fitting assembly utilizing a plug device.

Figure 12:
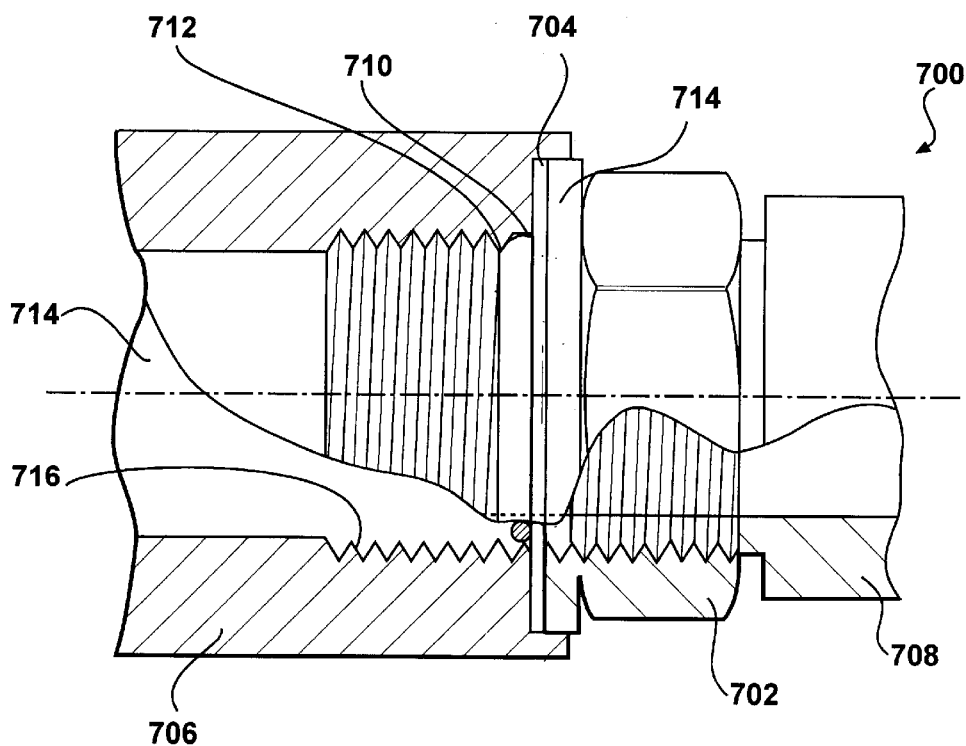
FIG. 12 is another alternative embodiment utilizing a nut with a separate washer in accordance with the teachings of the present invention.

FIG. 12 is an alternative to the FIG. 11 design, illustrating a fluid fitting 700 including a flanged nut 702, a conical-shaped washer 704 shown in a flattened position, a port 706 and a male connector 708. An o-ring 710 is positioned adjacent to the separate washer 704 and is located in a recess 712 located in the bore 714 of the port 706. The o-ring 710 is further positioned adjacent the threads 716. The washer 704 compresses the o-ring within the recess 712 to ensure integrity of the fitting.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. Further, the connectors and fittings disclosed herein are intended to be used in hydraulic applications. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

I claim:

1. A connector for a fluid conduit, the connector comprising:
   a conduit structure having a body portion, an externally threaded portion, and an unthreaded portion between the externally threaded portion and a seal portion, the unthreaded portion having an outside diameter which is less than a minor diameter of the externally threaded portion, a frustro-conical surface and a seal groove, the seal groove disposed between the threaded portion and the body portion, the seal groove formed into the frustro-conical surface along a plane that is perpendicular to the surface, the seal groove being defined by a constant radius; and
   a compressible annular seal member coupled to the conduit structure and disposed at least partially in the seal groove.

2. The connector of claim 1, wherein the annular seal member has a circular cross-section.

3. The connector of claim 2, wherein the depth of the seal groove is approximately equal to seventy-five percent of the cross-sectional diameter of the annular seal when the seal is in an uncompressed state.

4. The connector of claim 1, wherein the threaded portion is adapted for threadably engaging a mating connector and generating a clamping force which is exerted onto the annular seal.

5. The connector of claim 1, wherein the conduit structure further includes a fluid aperture having an axis which coincides with a longitudinal axis of the frustro-conical surface.

6. The connector of claim 1, wherein the frustro-conical surface is an exterior surface.

7. The connector of claim 1, wherein the frustro-conical surface is an interior surface.

8. The connector for a fluid conduit as claimed in claim 1, further comprising:

another conduit structure connected to an end of the body portion, said another conduit structure having a seal portion and an externally threaded portion, said externally threaded portion disposed between said seal portion and the body portion, the seal portion including another frustro-conical exterior surface and a seal groove, the seal groove formed into said another frustro-conical exterior surface and perpendicular thereto.

9. The connector of claim 8, further comprising an annular seal member coupled to said another conduit structure and disposed at least partially in the seal groove.

10. A connector for a fluid conduit, the connector comprising:

a conduit structure having an externally threaded portion, a seal portion, a body portion, and an unthreaded portion between the externally threaded portion and the seal portion, the unthreaded portion having an outside diameter which is less than a minor diameter of the externally threaded portion, the seal portion disposed between the externally threaded portion and the body portion, the seal portion including a frustro-conical exterior surface and a seal groove, the seal groove formed into the frustro-conical exterior surface at approximately 90 degrees to a plane extending along the exterior surface, the seal groove being defined by a constant radius; and a resilient seal member coupled to the conduit structure and disposed at least partially in the seal groove.

11. The connector of claim 10, wherein the annular resilient seal member has a circular cross-section.

12. The connector of claim 11, wherein the depth of the seal groove is approximately equal to seventy-five percent of the cross-sectional diameter of the resilient seal member.

13. The connector of claim 10, wherein the conduit structure further includes a fluid aperture having an axis which coincides with a longitudinal axis of the frustro-conical exterior surface.

14. The connector of claim 10, wherein the included angle of the frustro-conical portion is about 15 degrees to about 130 degrees.

15. The connector for a fluid conduit as claimed in claim 10, further comprising:

another conduit structure connected to an end of the body portion, said another conduit structure having a seal portion and an externally threaded portion, said externally threaded portion disposed between said seal portion and the body portion, the seal portion including another frustro-conical exterior surface and a seal groove, the seal groove formed into said another frustro-conical exterior surface and perpendicular thereto.

16. The connector of claim 15, further comprising an annular seal member coupled to said another conduit structure and disposed at least partially in the seal groove.

17. The connector of claim 10, further comprising another seal located on another frustro-conical surface.

18. The connector of claim 10, further comprising another frustro-conical surface that has a groove disposed therein for receiving a seal.

19. A connector for a fluid conduit, the connector comprising:

a body portion;

a first conduit structure connected to a first end of the body portion, the first conduit structure having a first externally threaded portion and an unthreaded portion between the externally threaded portion and a first seal portion, the unthreaded portion having an outside diameter which is less than a minor diameter of the externally threaded portion, the seal portion disposed between the first externally threaded portion and the body portion, the first seal portion including a first frustro-conical exterior surface and a first seal groove, the first seal groove formed into the first frustro-conical exterior surface at approximately a right angle thereto, the first seal groove being defined by a constant radius;

a second conduit structure connected to a second end of the body portion, the second conduit structure having a second seal portion and a second externally threaded portion, the second externally threaded portion disposed between the second seal portion and the body portion, the second seal portion including a second frustro-conical exterior surface and a second seal groove, the second seal groove formed into the second frustro-conical exterior surface and perpendicular thereto, the second seal groove being defined by a constant radius;

a first annular seal member coupled to the first conduit structure and disposed at least partially in the first seal groove; and a second annular seal member coupled to the second conduit structure and disposed at least partially in the second seal groove.

* * * * *